(12) United States Patent
Kang (10) Patent No.: US 7,746,407 B2
(45) Date of Patent: Jun. 29, 2010

(54) APPARATUS AND METHOD FOR STORING DATA IN A DIGITAL BROADCASTING RECEIVER

(75) Inventor: Dong In Kang, Gwangju (KR)

(73) Assignee: LG Electronics Inc., Seoul (KR)

( * ) Notice: Subject to any disclaimer, the term of this patent is extended or adjusted under 35 U.S.C. 154(b) by 1098 days.

(21) Appl. No.: 11/412,049

(22) Filed: Apr. 27, 2006

(65) Prior Publication Data

US 2006/0263043 A1 Nov. 23, 2006

(30) Foreign Application Priority Data

Apr. 28, 2005 (KR) ...................... 10-2005-0035381

(51) Int. Cl.
*H04N 7/01* (2006.01)
*H04N 11/02* (2006.01)
(52) U.S. Cl. ................. 348/441; 348/388.1; 348/425.3; 714/6
(58) Field of Classification Search ......... 348/441–458, 348/731, 388.1, 397.1, 398.1, 409.1, 410.1, 348/425.1, 425.3; 375/240.01–240.29; 714/6, 714/775, 819–822; 386/116, 84
See application file for complete search history.

(56) References Cited

U.S. PATENT DOCUMENTS

| 6,798,595 B2 | 9/2004 | Saito ........................... 360/53 |
| 7,212,570 B2 * | 5/2007 | Akiyama et al. ....... 375/240.01 |
| 2005/0265484 A1 * | 12/2005 | Kim et al. .................... 375/316 |

FOREIGN PATENT DOCUMENTS

| CN | 1358311 A | 7/2002 |
| CN | 1365233 A | 8/2002 |
| CN | 1595972 A | 3/2005 |

OTHER PUBLICATIONS

Chinese Office Action dated Mar. 27, 2009.
Chinese Office Action dated Jun. 20, 2008.

* cited by examiner

*Primary Examiner*—M. Lee
(74) *Attorney, Agent, or Firm*—Ked & Associates LLP (57) ABSTRACT

Embodiments of an apparatus and a method for storing data in a digital broadcasting receiver can convert received digital TV broadcasting data into data of another format before being stored. In one embodiment, redundancy data of the digital TV broadcasting data can be generated based on the converted data of the predetermined format and stored with the converted data of the predetermined format to variably output two formats of data with the single stored data.

19 Claims, 6 Drawing Sheets

Note  dmb : *DMB formatted data file*
rdn : *redundancy data file*

APPARATUS AND METHOD FOR STORING DATA IN A DIGITAL BROADCASTING RECEIVER

BACKGROUND OF THE INVENTION

1. Field of the Invention

The present invention relates to an apparatus and a method for storing data in a digital broadcasting receiver, and more particularly to an apparatus and a method for converting received digital television (hereinafter, referred to as TV) broadcasting data to data in a different format and storing the converted data.

2. Background of the Related Art

Generally, a digital broadcasting receiver such as a digital television and a set-top box (STB) having a digital broadcasting reception function receives digital TV broadcasting data of an Advanced Television Systems Committee (ATSC) MPEG-2 Transport Streams (TSs), which belongs to a digital TV broadcasting scheme. The digital broadcasting receiver performs a MPEG decoding and a signal processing for the received digital TV broadcasting data, and outputs video data of high picture quality and audio data of high speech quality.

Further, a digital broadcasting receiver with a Personal Video Recording (hereinafter, referred to as PVR) function has also been developed and commercialized. The PVR can store received digital TV broadcasting data of ATSC MPEG-2 TSs in a high capacity hard disk, and reproduce the stored digital TV broadcasting data at a time desired by a user.

With the start of a Digital Multimedia Broadcasting (DMB) based on the mobility, a mobile terminal such as a mobile phone and a Personal Digital Assistant (PDA) with a DMB reception function has been developed and commercialized. Herein, DMB format video data have a resolution of maximum 352×288 pixels and DMB format audio data have speech quality of a CD level. When the audio data are provided together with video, the audio data have speech quality better than that of an analog FM radio.

However, the related art digital broadcasting system has various disadvantages. For example, the related art digital broadcasting system only provides a limited subset of programs in the DMB format.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a digital broadcasting receiver and method that can solve at least the above problems and/or disadvantages and to provide at least the advantages described hereinafter.

Another object of the invention is to provide a digital broadcasting receiver and method that can convert first format received data into a different second format with conversion data so that the received data can be transmitted in the first or second format for playback.

Another object of the invention is to provide a method and an apparatus that can directly or automatically transmit digital TV broadcasting programs stored in a digital broadcasting receiver according to a different decoding scheme employed by another apparatus.

In order to achieve at least the above objects in a whole or in part, according to one aspect of the present invention, there is provided a method for storing received digital broadcasting data in a digital broadcasting receiver that includes converting the received digital broadcasting data into data of a predetermined format different from a format of the digital broadcasting data and storing the converted data of the predetermined format.

To further achieve the above objects in a whole or in part, according to another aspect of the invention, there is provided a method for storing received digital broadcasting data in a digital broadcasting receiver that includes converting the received digital broadcasting data into data of a predetermined format different from a format of the digital broadcasting data and generating redundancy data of the digital broadcasting data based on the converted data of the predetermined format and storing the redundancy data together with the converted data of the predetermined format.

To further achieve the above objects in a whole or in part, according to another aspect of the invention, there is provided a digital broadcasting receiver that includes a receiver configured to receive the digital broadcasting data, a converter coupled to the receiver and configured to convert the received digital broadcasting data into data of a reduced quality Digital Multimedia Broadcasting (DMB) format for a mobile terminal different from a format of the digital broadcasting data, a storage device coupled to the converter configured to store the converted data and a controller configured to control the converted data of the predetermined format to be stored in the storage unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Embodiments according to the invention can be applied to various types of digital broadcasting receivers such as STBs and digital TVs with PVR functions, which receive digital TV broadcasting data and store the received digital TV broadcasting data in a storage device such as a hard disk.

Figure 1:
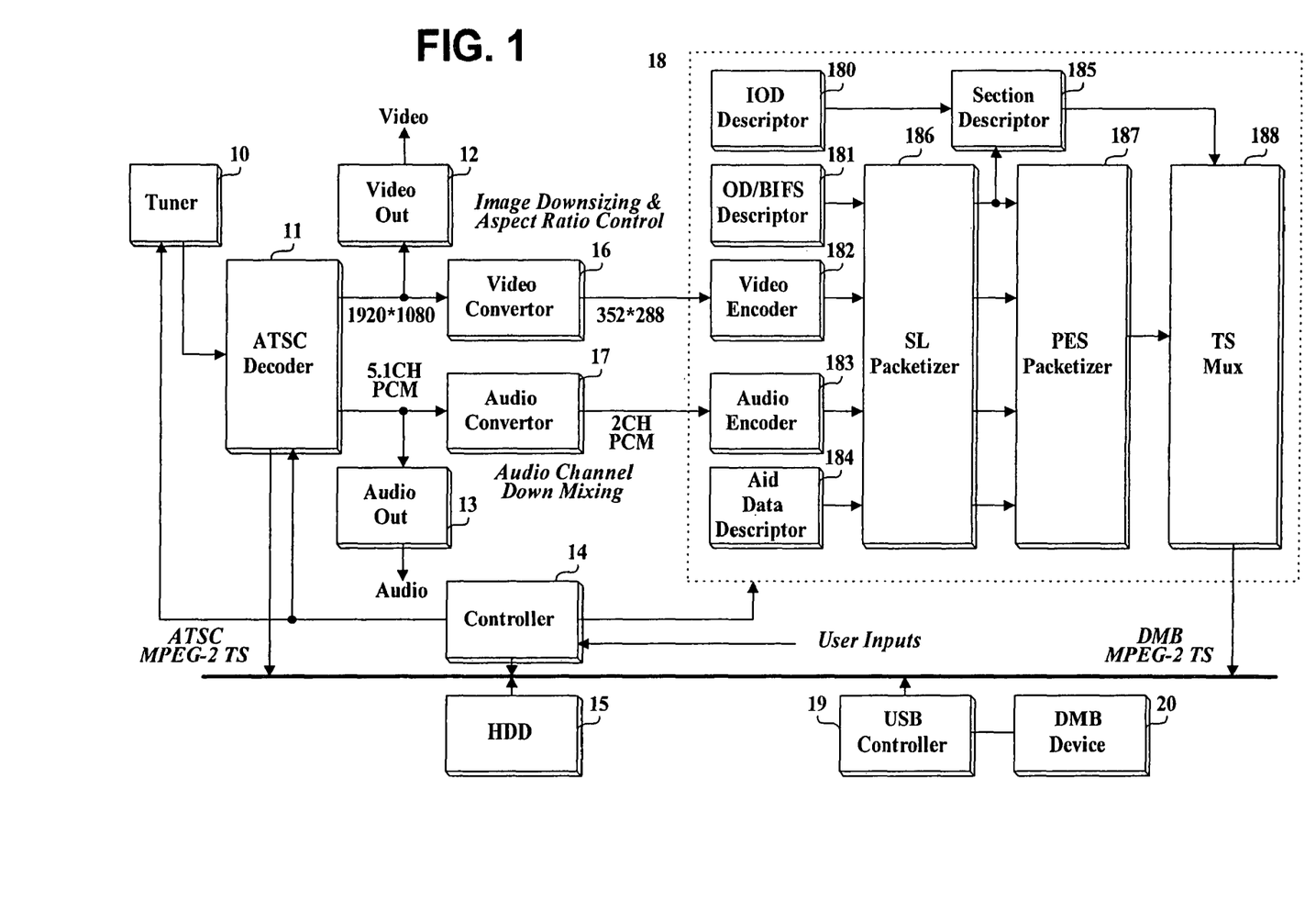
FIG. 1 is a block diagram illustrating the construction of a digital broadcasting receiver according to one embodiment of the present invention.

FIG. 1 is a block diagram illustrating the construction of a digital broadcasting receiver according to one embodiment of the invention. As shown in FIG. 1, the digital broadcasting receiver can include a tuner 10, an ATSC decoder 11, a video output unit 12, an audio output unit 13, a controller 14, and a hard disk 15.

As shown in FIG. 1, the digital broadcasting receiver can further include a video converter 16, an audio converter 17, a DMB encoder 18 and a Universal Serial Bus (USB) controller 19. A mobile terminal 20 with a DMB reception function can be coupled to the digital broadcasting receiver through a USB port controlled by the USB controller 19.

As shown in FIG. 1, the DMB encoder 18 may include an Initial Object Descriptor (IOD) descriptor generator 180, an OD/Binary Format for Scene (BFIS) descriptor generator 181, a video encoder 182, an audio encoder 183, an aid data descriptor generator 184, a section descriptor generator 185, a Sync Layer (SL) packetizer 186, a Packetized Elementary Stream (PES) packetizer 187, a TS multiplexer 188, etc.

The controller 14 can control tuning of the tuner 10 according to a user request to select a digital TV broadcasting channel. The ATSC decoder 11 can decode the digital TV broadcasting data, e.g., data of ATSC MPEG-2 TSs, of the channel tuned through the tuner 10, into audio and video data. The video output unit 12 can signal process the decoded video data to output video signals of high picture quality, and the audio output unit 13 can perform signal processing and amplification for the decoded audio data to output audio signals of high speech quality. The ATSC MPEG-2 TSs of the tuned digital TV broadcasting program can also be stored in the hard disk 15.

The video converter 16 can perform an image downsizing operation of converting the video data decoded by the ATSC decoder 11, e.g., a picture sequence with a resolution of 1920×1080 pixels, to a picture sequence with a reduced resolution (e.g., 352×288 pixels), which can be employed by the DMB encoder 18. In addition, the video converter 16 can perform an aspect ratio control operation for adjusting the aspect ratio of the video data to be proper for the aspect ratio of an LCD screen with a reduced size (e.g., 2.2, 3.5 or 7 inch), which the mobile terminal 20 can employ. For example, an aspect ratio for conversion may be preset or modified through an environment setup menu, which is provided by the controller 14 through an already embedded Graphic User Interface (GUI), as conversion conditions.

The audio converter 17 can perform an audio channel down mixing operation of converting the audio data decoded by the ATSC decoder 11, e.g., 5.1 CH Pulse Code Modulation (PCM) audio data, to data of a format that the DMB encoder 18 can employ, e.g., 2 CH PCM audio data.

The DMB encoder 18 can encode the video data converted by the video converter 16 and the audio data converted by the audio converter 17 into DMB format data. The IOD descriptor generator 180 can generate an IOD conforming to an ISO/IEC 14496-1 standard, and the OD/BFIS descriptor generator 181 can generate an OD/BFIS stream conforming to the ISO/IEC 14496-1 standard.

The video encoder 182 can encode the video data converted by the video converter 16 into DMB format video data according to a H.264/AVC standard. The audio encoder 183 can encode the audio data converted by the audio converter 17 into DMB format audio data according to an ISO/IEC 14496-3 BSAC standard.

The aid data descriptor generator 184 can generate an aid data descriptor in addition to the descriptors generated by the IOD descriptor generator 180 and the OD/BFIS descriptor generator 181. The section descriptor generator 185 can generate a section including an IOD/OD/BIFS according to an ISO/IEC 13818-1 standard.

The SL packetizer 186 can generate a SL packet, which is a synchronization packet, from the inputted data streams according to the ISO/IEC 14496-1 standard, the PES packetizer 187 can packetize the SL packet into a PES packet according to the ISO/IEC 13818-1 standard. The TS mux 188 can multiplex the inputted section and PES packet into DMB MPEG-2 TSs conforming to the DMB format.

The DMB MPEG-2 TSs can be stored in the hard disk 15. For example, the hard disk 15 separately store the DMB MPEG-2 TSs and the ATSC MPEG-2 TSs of the digital TV broadcasting format outputted from the ATSC decoder 11 as different data files.

Figure 2:
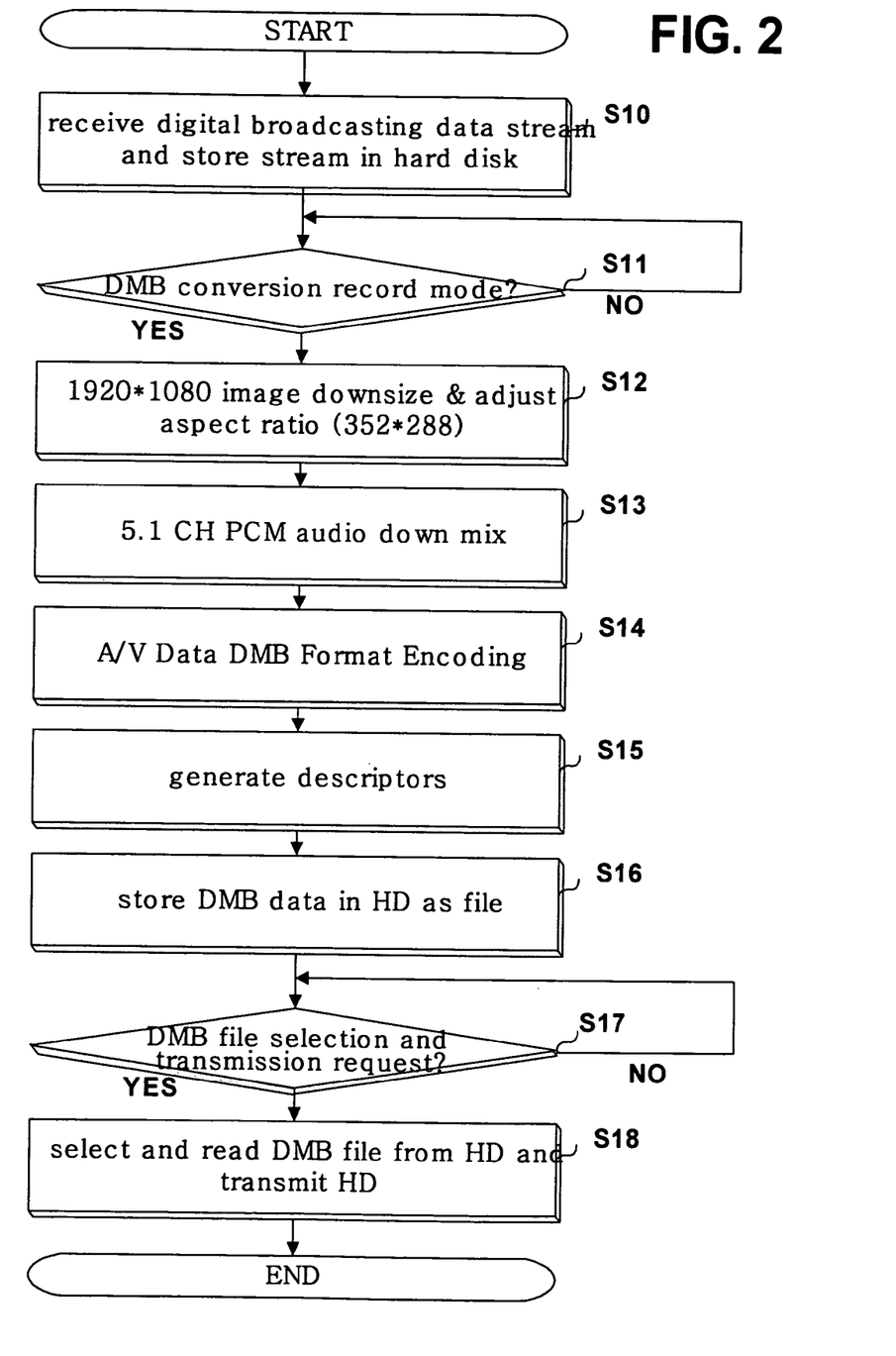
FIG. 2 is a flow chart illustrating a data storage method in a digital broadcasting receiver according to one embodiment of the present invention.

FIG. 2 is a flow chart illustrating a data storage method in the digital broadcasting receiver according to one embodiment of the invention. The embodiment of the method of FIG. 2 can be applied to and will be described using the digital broadcasting receiver shown in FIG. 1. However, the invention is not intended to be so limited.

The controller 14 can control the tuner 10 and tune one random digital TV broadcasting channel according to a user's request. The ATSC decoder 11 can demodulate the signals of the channel tuned by the tuner 10 to obtain digital TV broadcasting data of ATSC MPEG-2 TSs, decode the digital TV broadcasting data into audio data and video data, and output the audio data and the video data to the video output unit 12 and the audio output unit 13, respectively. Further, the ATSC decoder 11 can store the digital TV broadcasting data of the ATSC MPEG-2 TSs in the hard disk 15 as files for a PVR function (block S10). By the user's selection, however, it may also be impossible to store currently received digital TV broadcasting data in the hard disk 15.

A DMB format data conversion storage mode can be set in use environments through the embedded GUI of the controller 14, for example, by a user (block S11). Then, the controller 14 can enable operations of the DMB encoder 18 convert the currently received digital TV broadcasting data to DMB format data, and control the DMB format data to be stored in the hard disk 15.

For example, the video converter 16 can perform an image downsizing operation of converting a picture sequence with a resolution of 1920×1080 pixels outputted from the ATSC decoder 11 to a picture sequence with a resolution of 352×288 pixels, which the DMB encoder 18 can employ. In addition, the video converter 16 can perform an aspect ratio control operation of adjusting the aspect ratio of the video data to be proper for the aspect ratio of an LCD screen with a size of 2.2, 3.5 or 7 inch, which can be set in the use environments and can be employed by the mobile terminal 20 (block S12).

The audio converter 17 can perform an audio channel down mixing operations. Thus, a 5.1 CH PCM audio data outputted from the ATSC decoder 11 can be converted to 2 CH PCM audio data that can be processed by the DMB encoder 18 (block S13).

The DMB encoder 18 can encode the video data converted by the video converter 16 and the audio data converted by the audio converter 17 into DMB format data. For example, the video encoder 182 of the DMB encoder 18 can encode the video data converted by the video converter 16 into DMB format video data according to the H.264/AVC standard, and the audio encoder 183 can encode the audio data converted by the audio converter 17 into DMB format audio data according to the ISO/IEC 14496-3 BSAC standard (block S14).

The IOD descriptor generator 180 can generate an IOD conforming to the ISO/IEC 14496-1 standard, and the OD/BFIS descriptor generator 181 can generate an OD/BFIS stream conforming to the ISO/IEC 14496-1 standard. Further, the aid data descriptor generator 184 can additionally generate an aid data descriptor in addition to the descriptors generated by the IOD descriptor generator 180 and the OD/BFIS descriptor generator 181, and the section descriptor generator 185 can generate a section including the IOD/OD/BIFS according to the ISO/IEC 13818-1 standard (block S15).

The SL packetizer 186 can generate a SL packet, which is a synchronization packet, from the inputted data streams according to the ISO/IEC 14496-1 standard, the PES packetizer 187 can packetize the SL packet into a PES packet according to the ISO/IEC 13818-1 standard, and the TS mux 188 can combine the inputted section and PES packet into DMB MPEG-2 TSs conforming to the DMB format. The DMB MPEG-2 TSs can be written and stored in the hard disk 15 (block S16).

For example, the controller 14 can separately store the MPEG-2 TS data of the DMB format and the ATSC MPEG-2 TS data demodulated from the received broadcasting signals. One method for differentiating and storing the data may include a method for identifying the data using file names or file extensions. Other methods can discriminate regions in the same storage device or store data in different storage devices. However, the invention is not intended to be so limited thereby.

Figure 3:
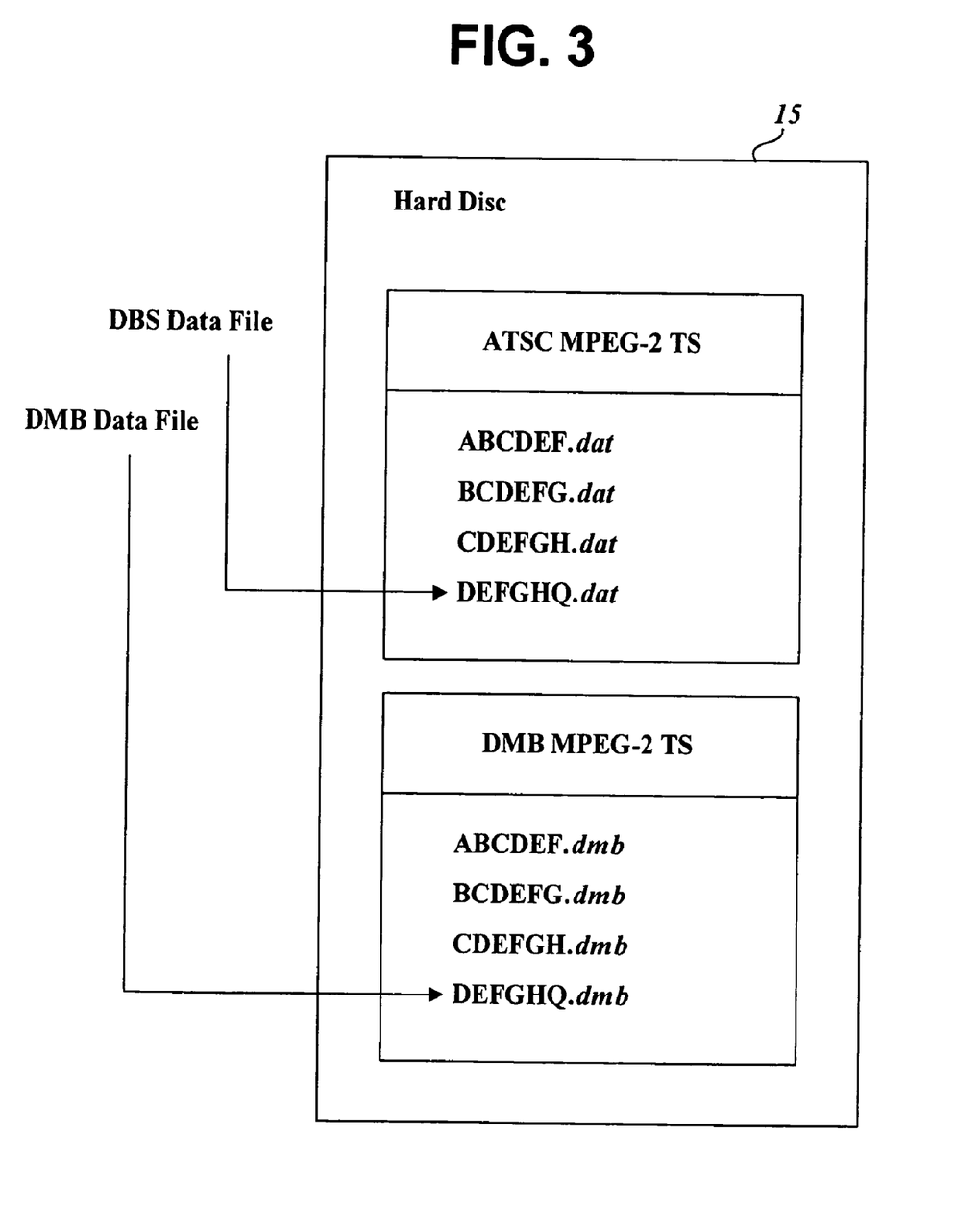
FIG. 3 is a diagram illustrating an example according to one embodiment of the present invention, in which a digital TV broadcasting data file and a DMB format data file are separately stored in a hard disk as different files.

FIG. 3 is a diagram illustrating an example in which the same file names are given to the same programs, different extensions are given to the same files, and the files are separately stored. FIG. 3 shows an exemplary case where ATSC MPEG-2 TS data of the digital TV broadcasting are designated as a file of 'DEFGHQ.dat', the MPEG-2 TSs of the DMB format are designated as a file of 'DEFGHQ.dmb', and the two files are stored in the hard disk 15. The file name 'DEFGHQ' may be a part of a title of the received broadcasting program.

Figure 4:
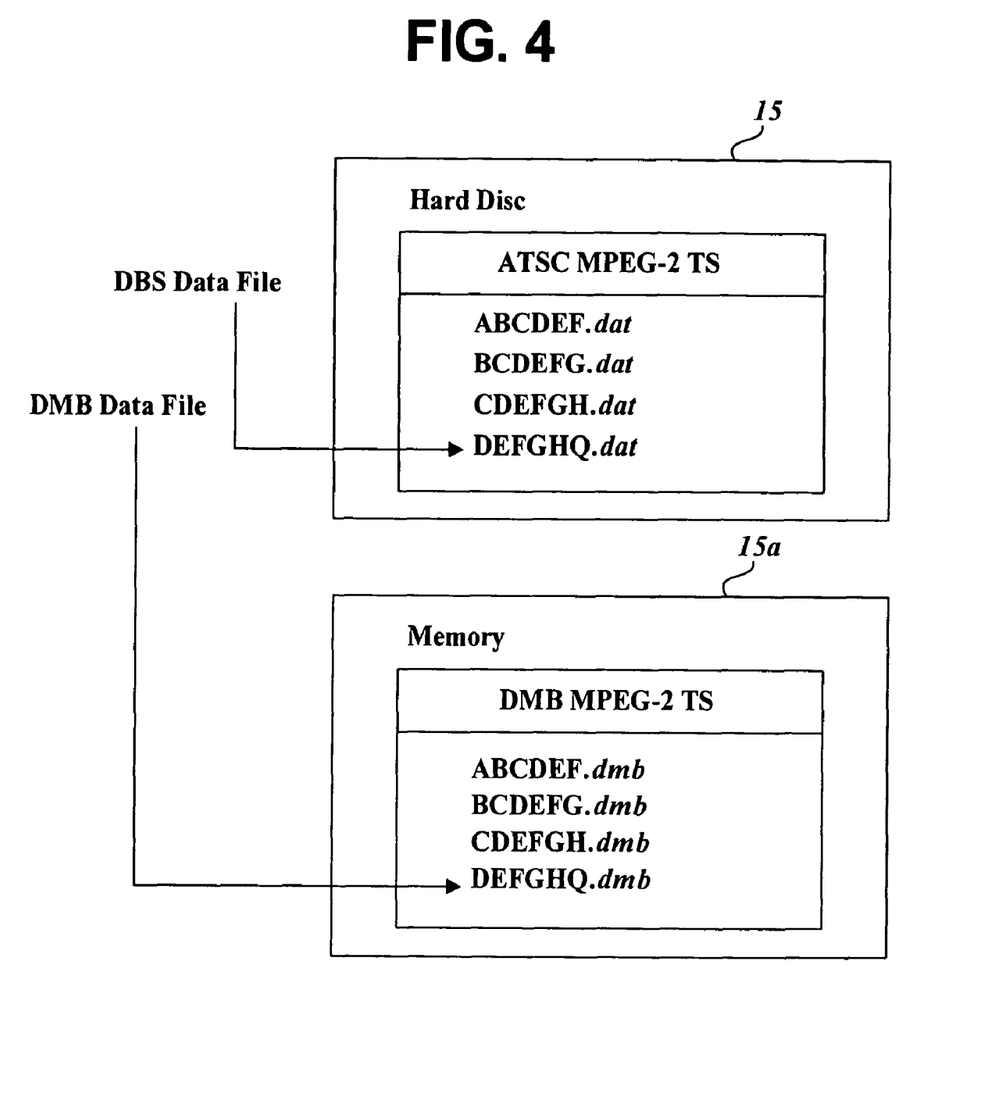
FIG. 4 shows a diagram illustrating an example according to one embodiment of the present invention, in which a digital TV broadcasting data file and a DMB format data file are stored in different storage media, respectively.

FIG. 4 shows an exemplary case in which data are stored in different storage mediums. As shown in FIG. 4, the data file of the digital TV broadcasting may be stored in the hard disk 15, and the DMB format data file may be stored in a separate record medium different from the hard disk 15, e.g., a flash memory 15a, which can be a non-volatile memory.

When the received broadcasting program is stored after being converted to the DMB format data as described above, the DMB terminal 20 with the DMB reception function, e.g., the DMB terminal such as a mobile phone and a PDA with a DMB decoder, can be coupled to the digital broadcasting receiver.

Then, a user can select one random DMB data file through a selection screen provided through the already embedded GUI by the controller 14 and request transmission of the selected DMB data file (block S17). In this case, the controller 14 can read the requested DMB data file from the hard disk 15 and transmit the read DMB data file to the DMB terminal 20 wireless, wire line (e.g., through the USB controller 19) or the like (block S18).

Further, when the selected DMB data file is stored in the memory 15a instead of the hard disk 15 as described above, the controller 14 can read the DMB data file stored in memory 15a and transmit the read DMB data file to the DMB terminal 20 through the USB controller 19.

Accordingly, the DMB terminal 20 can connect to the digital broadcasting receiver and then store the DMB data file in a memory therein. As soon as the transmission of the DMB data file is requested, the DMB data can be transmitted (e.g., automatically or instantly). Then, when a reproduction request is received from the user, the DMB terminal 20 can decode and output the file. Therefore, the user can watch the digital TV broadcasting program as if the user were watching the DMB broadcasting.

Figure 5:
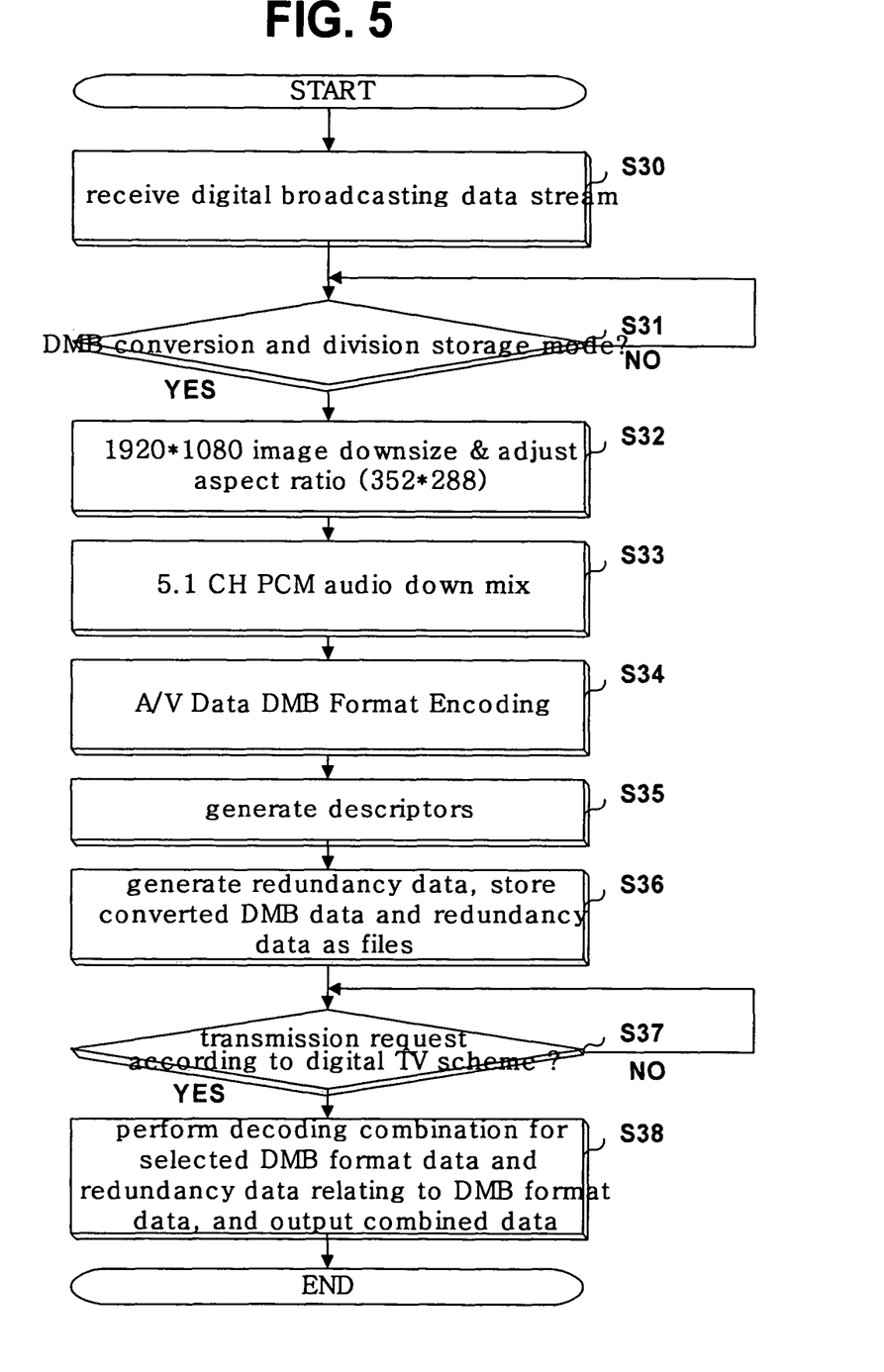
FIG. 5 is a flow chart illustrating a data storage method in a digital broadcasting receiver according to another embodiment of the present invention.

FIG. 5 is a flow chart illustrating a data storage method in a digital broadcasting receiver according to another embodiment of the invention. In the embodiment shown in FIG. 5, digital TV broadcasting program data can be divided into DMB format data and redundancy data and the divided data are stored. Thus, the program data is preferably not stored as received.

As shown in FIG. 5, digital TV broadcasting data streams are received (block S30). When a mode for dividing the data streams into the DMB format data and the redundancy data and storing the divided data has been set in the digital broadcasting receiver (block S31), preferably the digital TV broadcasting data of ATSC MPEG-2 TSs demodulated by the ATSC decoder 11 are not stored, and the DMB encoder 18 can be enabled so as to convert the digital TV broadcasting data into the DMB format data.

The video converter 16 can perform an image downsizing operation of converting a picture sequence with a resolution of 1920×1080 pixels outputted from the ATSC decoder 11 to a picture sequence with a resolution of 352×288 pixels, which the DMB encoder 18 can employ. In addition, the video converter 16 can perform an aspect ratio control operation of adjusting the aspect ratio of the video data to be proper for the aspect ratio of a LCD screen with a size of 2.2, 3.5 or 7 inch, which can be already set in use environments and used by the mobile terminal 20 (S32).

The audio converter 17 can perform an audio channel down mixing operation of converting 5.1 CH PCM audio data outputted from the ATSC decoder 11 to 2 CH PCM audio data that can be processed by the DMB encoder 18 (block S33).

The DMB encoder 18 can encode the video data converted by the video converter 16 and the audio data converted by the audio converter 17 into DMB format data. For example, the video encoder 182 of the DMB encoder 18 can encode the video data converted by the video converter 16 into DMB format video data according to the H.264/AVC standard, and the audio encoder 183 can encode the audio data converted by the audio converter 17 into DMB format audio data according to the ISO/IEC 14496-3 BSAC standard (block S34).

The IOD descriptor generator 180 can generate an IOD conforming to the ISO/IEC 14496-1 standard, and the OD/BFIS descriptor generator 181 can generate an OD/BFIS stream conforming to the ISO/IEC 14496-1 standard. Further, the aid data descriptor generator 184 can additionally generate an aid data descriptor in addition to the descriptors generated by the IOD descriptor generator 180 and the OD/BFIS descriptor generator 181, and the section descriptor generator 185 can generate a section including the IOD/OD/BIFS according to the ISO/IEC 13818-1 standard (block S35).

The SL packetizer 186 can generate a SL packet from the inputted data streams according to the ISO/IEC 14496-1 standard. The PES packetizer 187 can packetize the SL packet into a PES packet according to the ISO/IEC 13818-1 standard, and the TS mux 188 can multiplex the inputted section and PES packet into DMB MPEG-2 TSs conforming to a DMB format.

Figure 6:
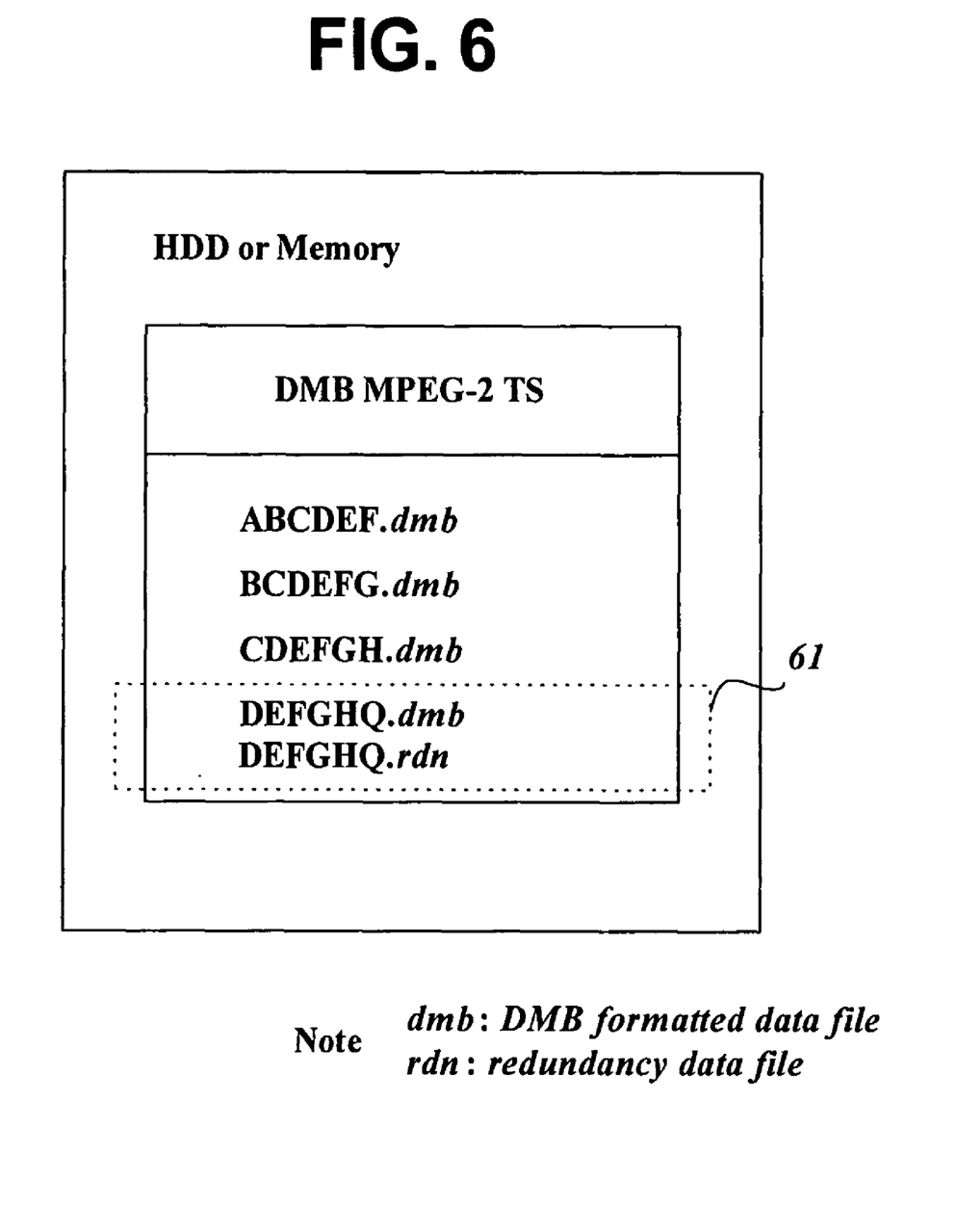
FIG. 6 shows a diagram illustrating an example according to the present invention, in which DMB format data and redundancy data of digital TV broadcasting data are stored.

The DMB MPEG-2 TSs can be written and stored in the hard disk 15 or the separate memory 15a. For example, the controller 14 can control the MPEG-2 TS data of the DMB format to be stored together with redundancy data lost in the format conversion process (block S36). From the standpoint of the converted DMB format data, the lost data may be redundancy data that could improve the size and picture quality of a picture. The converted DMB format data and the redundancy data can be stored separately into different files 61 as illustrated in FIG. 6, e.g., "DEFGHO.dmb" and "DEFGHO.rdn". The separately stored files 61 can have the same file name but different extensions to be associated each other.

One exemplary method for obtaining the redundancy data will now be described. However, the invention is not intended to be so limited. In the case of image signals, the redundancy data can be obtained by decoding the converted DMB format image data again, enlarging each frame of the decoded data, and encoding difference between an image, which is predicted from the enlarged frame and/or a frame adjacent to the enlarged frame, and an image of the corresponding frame, which is temporarily stored after being decoded by the ATSC decoder 11, according to a digital TV broadcasting scheme.

In the case of audio signals, the redundancy data can be obtained by encoding only audio data of an unselected channel again according to an audio encoding scheme for TV broadcasting signals. When transmission of the DMB format data file is requested, only the previously stored the DMB format file (*.dmb) is selected between the DMB format file (*.dmb) and the redundancy file (*.rdn) relating to the DMB format file, and the selected DMB format file can be transmitted through the USB controller 19.

If reproduction according to a digital TV scheme is requested (block S37), the selected DMB format data file (*.dmb) and the redundancy file (*.rdn) having the same file name in relation to the DMB format file can be combined and decoded, so that the original image sequence of the digital TV broadcasting data is outputted. In this way, for example, even without recording the digital TV broadcasting data file, the original image sequence of the digital TV broadcasting data can be reproduced (e.g., the DMB format data and the redundancy data can be combined) (block S38).

In one example for conducting combinational decoding of the DMB format data and the redundancy data, the DMB format data can be decoded first. Then, each frame of the decoded data can be enlarged, and image difference data between each enlarged frame and each frame decoded from the redundancy data can be restored to an original image based on images of the enlarged corresponding frame and/or frames adjacent to the enlarged frame.

In the embodiment of FIG. 5, when the data converted by another format is transmitted, storage space can be more efficiently utilized as compared with a case where data files of different formats. However, in one embodiment data files of the digital TV broadcasting format and the DMB format can be separately stored.

The above-described scheme, which converts the digital TV broadcasting signals into signals of another format while storing the converted signals, can also be applied (used when) to another case in which a broadcasting program for which a recording reservation has been set is recorded.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc As described above, embodiments of an apparatus and method for storing received digital broadcasting data having various advantages. For example, in an apparatus and a method for storing data in a digital broadcasting receiver, a user can copy a digital TV broadcasting program into a mobile terminal without a separate process for conversion on receiving the digital TV broadcasting program, and watch the received digital TV broadcasting program regardless of time and place. Further, when the digital broadcasting receiver divides digital TV broadcasting data into DMB format data and redundancy data and stores the divided data, the digital broadcasting receiver can perform conversion and storage of the digital TV broadcasting program for the mobile terminal without increasing the use of storage space relating to recording the digital TV broadcasting program without division or conversion.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for storing received first broadcasting data in a digital broadcasting receiver, the method comprising:
   converting the received first broadcasting data into second data of a predetermined format different from a format of the first broadcasting data;
   generating third data of the first broadcasting data based on the converted second data of the predetermined format;
   storing the third data with the converted second data of the predetermined format; and
   reading the stored second data of the predetermined format and the third data, performing a decoding combination for the read data; and outputting the combined data with the first broadcasting data.

2. The method of claim 1, wherein the third data corresponds to redundancy data of the first broadcasting data.

3. The method of claim 2, the outputting comprising outputting the combined data with image data and audio data of the first broadcasting data.

4. The method of claim 3, further comprising
   reading the stored second data of the predetermined format and
   transmitting the read data to an external device connected to the digital broadcasting receiver, wherein the predetermined format is digital multimedia broadcasting format.

5. The method of claim 4, wherein the converting comprises
reducing at least one of a screen size and a number of audio channels of the first broadcasting data.

6. The method of claim 1, further comprising
reading the stored second data of the predetermined format and transmitting the read data to an external device connected to the digital broadcasting receiver, wherein the predetermined format is digital multimedia broadcasting format.

7. The method of claim 1, further comprising separately storing the converted second data of the predetermined format and the first broadcasting data, and wherein the predetermined format includes a digital multimedia broadcasting (DMB) format.

8. The method of claim 7, wherein the separately storing comprises separately storing the converted second data of the DMB format and the first broadcasting data in an identical storage device as separate files or in different storage devices.

9. A method for storing received digital broadcasting data in a digital broadcasting receiver, the method comprising:
converting the received digital broadcasting data into data of a predetermined format different from a format of the digital broadcasting data; and
generating redundancy data of the digital broadcasting data based on the converted data of the predetermined format and storing the redundancy data together with the converted data of the predetermined format, wherein, in case of an image, the redundancy data include data obtained by coding difference data between an image estimated from a frame of the converted data of the predetermined format and an image of a corresponding frame of digital broadcasting data.

10. The method of claim 9, wherein the converting comprises
reducing at least one of a screen size or a number of audio channels of the digital broadcasting data.

11. The method of claim 9, wherein the storing comprises
separately storing the converted data of the predetermined format and the digital broadcasting data in an identical storage device as separate files or in different storage devices.

12. A method for storing received digital broadcasting data in a digital broadcasting receiver, the method comprising:
converting the received digital broadcasting data into data of a predetermined format different from a format of the digital broadcasting data; and
generating redundancy data of the digital broadcasting data based on the converted data of the predetermined format and storing the redundancy data together with the converted data of the predetermined format, the method further comprising:
reading the stored data of the predetermined format and the redundancy data, performing a decoding combination for the read data, and outputting the combined data with picture quality and speech quality of the digital broadcasting data.

13. A digital broadcasting receiver, comprising:
a receiver configured to receive the digital broadcasting data;
a converter coupled to the receiver and configured to convert the received digital broadcasting data into data of a reduced quality digital multimedia broadcasting (DMB) format for a mobile terminal different from a format of the digital broadcasting data;
a storage device coupled to the converter configured to store the converted data; and
a controller configured to control the converted data of the predetermined format to be stored in the storage unit, wherein, in case of an image, the redundancy data include data obtained by coding difference data between an image estimated from a frame of the converted data of the DMB format and an image of a corresponding frame of the digital broadcasting data.

14. The apparatus of claim 13, wherein the DMB format has at least one of a smaller screen size and a reduced number of audio channels from the digital broadcasting data, wherein the mobile terminal is a mobile phone or a PDA, and wherein the apparatus is a personal video recorder.

15. The apparatus of claim 14, wherein the DMB format has a 352×288 pixel image format.

16. The apparatus of claim 13, wherein the controller reads the stored data of the DMB format and transmits the read data to an external device connected through a connection unit.

17. The apparatus of claim 13, wherein the converter comprises:
a decoder to extract and decode the digital broadcasting data into audio and video data for output;
a downsizer to receive the audio and video data and perform and image downsizing to a reduce pixel resolution and adjust an aspect ratio thereof and perform an audio channel mixing operating to reduce the audio data to a two channel format; and
an encoder to receive the audio and video data from the downsizing unit and perform an MPEG-4 encoding into the predetermined format.

18. The apparatus of claim 17, wherein the converter generates redundancy data of the digital broadcasting data based on the converted data of the DMB format, and wherein the controller controls the redundancy data to be stored in the storage device or a different storage device.

19. The apparatus of claim 18,
wherein the controller is configured to read the stored data of the predetermined format and the redundancy data, perform a decoding combination for the read data, and output the combined data with picture quality and speech quality of the digital broadcasting data.

* * * * *